United States Patent [19]
Klien et al.

[11] 3,752,021
[45] Aug. 14, 1973

[54] APPARATUS FOR THE PRODUCTION OF GUIDE CHANNELS OF SKIS

[75] Inventors: Oswald Klien, Mader; Gert Klien; Paul Marte, both of Hohenems, all of Austria

[73] Assignee: Head Sportgerate GmbH, Kennelbach, Austria

[22] Filed: June 14, 1971

[21] Appl. No.: 152,950

[52] U.S. Cl............................ 83/5, 83/8, 83/431, 83/582
[51] Int. Cl.............................................. B26d 3/06
[58] Field of Search .................... 83/5, 8, 582, 431; 90/24 R, 24 F; 144/136 R; 280/11.13 R, 11.13 E, 11.13 J, 11.13 V, 11.13 P, 11.13 L, 11.13 S, 11.37 T

[56] References Cited
UNITED STATES PATENTS

| | | | |
|---|---|---|---|
| 3,542,388 | 11/1970 | Veneko | 280/11.13 L |
| 2,522,803 | 9/1950 | Schulkins | 144/136 |
| 275,794 | 4/1883 | Ward | 83/5 X |
| 534,000 | 2/1895 | Nicolai | 83/5 |
| 641,791 | 1/1900 | Nicolai | 83/5 |
| 1,704,192 | 3/1929 | Hoagland | 83/5 X |
| 3,059,515 | 10/1962 | Lindsey | 83/5 |

FOREIGN PATENTS OR APPLICATIONS

| | | | |
|---|---|---|---|
| 82,085 | 7/1895 | Germany | 83/5 |

Primary Examiner—Frank T. Yost
Attorney—Cushman, Darby & Cushman

[57] ABSTRACT

Apparatus for forming a guide channel in a plastic sliding surface of a ski. Means are provided to move the ski in its longitudinal direction to bring the plastic sliding surface into contact with a cutter which is fixed with respect to the longitudinal direction of movement of the ski. The cutter is shaped to correspond to the cross-section of the channel to be formed, and means are provided for obtaining relative movement of the cutter and the ski in a direction normal to the longitudinal direction of the ski so as to control the depth of the channel formed in the sliding surface.

11 Claims, 5 Drawing Figures

Patented Aug. 14, 1973  3,752,021

INVENTORS
OSWALD KLIEN
GERT KLIEN
PAUL MARTE

APPARATUS FOR THE PRODUCTION OF GUIDE CHANNELS OF SKIS

Guide channels in skis previously have been produced by milling cutters. Usually, rotating cutters having two or four cutting edges, as well as end-milling cutters have been used. However, particularly with plastic sliding surfaces, such techniques produced the disadvantage of so-called chatter marks on the surface of the channels. These chatter marks were small waves, and in order to remove them it was necessary to abrade the channels in a second working run, which usually had to be done by hand.

The purpose of the invention to avoid these disadvantages. The inventive process for producing a guide channel in plastic sliding surfaces of skis essentially consists in cutting the guide channel by a single cutting, the cross-section of which corresponds to the cross-section of the channel. It has been provided that in this way an entirely smooth channel can be produced, which, without reworking by abrading, is at least as smooth as a channel subsequently abraded. By removing the material from the channel in one single cutting, not only is the production process shortened, but because the relatively large cross-section of the cutting, a much smoother cut is achieved than by removing the material in several cuttings. Thus, apart from the advantages of a more simple and faster production process, a guide channel produced according to the inventive process is, with regard to the quality of its surface, superiod to a milled and subsequently abraded guide channel.

The inventive apparatus for performing this process is essentially characterized in that the cutter is immovably arranged with respect to the direction of the cut, that the front of the cutter corresponds to the cross-section of the channel, and that the ski is slideably supported in its longitudinal direction. Because of the fact that the cutter is stationarily arranged with respect to the direction of the cut while the ski is performing the mechanical movement, a rigid position of the cutter is guaranteed without particular constructional cast, so that any vibration causing an unsmooth cut is avoided with certainty. Such a simple construction lies in the fact that the ski is pressed by at least one resiliently supported feed roller against a controlling device cooperating with the sliding surface of the ski or with a form connected to the ski, said controlling device determining the cutting depth of the cutter. Thus, by rigidly arranging the cutter in respect of the cutting direction, and by moving the ski in its longitudinal direction, there is also in mass production the advantage that one ski after the other can be conveyed to the cutter in longitudinal direction, the cutter maintaining its position.

According to the invention, the controlling device may be a distance roller, the axis of which is rigidly connected to the cutter. If, for instance, this distance roller rolls along the sliding surface of the ski, the depth of the guide channel is precisely determined thereby. The ski is arched in longitudinal direction thereof and such a distance roll, therefore, provides a correct course for the guide channel anywhere along the length of the ski. At the beginning and the end of the ski the guide channel should be less deep and the base of the guide channel should merge gradually into the sliding surface. According to the invention, this can be advantageously achieved when using a distance roller the axis of which is rigidly fixed to the cutter, by controlling the beginning and the ending of the guide channel by employing wedge-shaped supports on the sliding surface of the ski.

But it is possible, too, to movably support the cutter relative to the controlling device to which the ski is pressed by the feed roller (or feed rollers), vertically with respect to the sliding surface of the ski or to the cutting direction to thereby control the cutting depth of the cutter according to the desired channel depth. In this case, the cutter also remains stationary in respect to the cutting direction and is only withdrawn relative to the controlling device cooperating with the sliding surface of the ski, in order to provide a shallow portion of the channel on both ends of the ski.

In the drawing, the invention is schematically illustrated by way of several embodiments.

Figure 1:
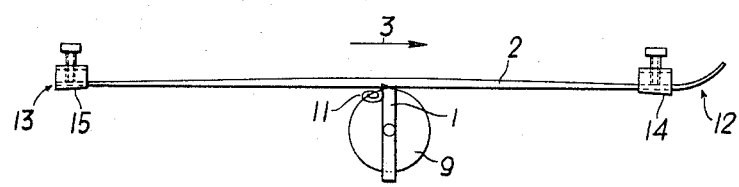
FIG.1 illustrates the ski and the cutter in operating position.
Figure 2:
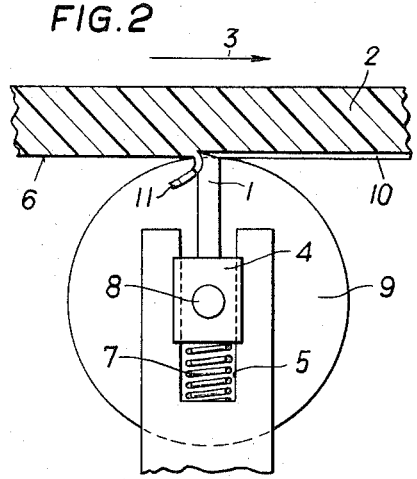
FIG.2 illustrates a variation in which the cutter is resiliently supported.

As is shown in FIG.1, the cutter 1 is stationarily arranged while ski 2 is moved in the direction of arrow 3. In the arrangement according to FIG.2, the cutter-holder 4 is movably guided in a controlling device 5, in a vertical direction with respect to the sliding surface of the ski, and the cutter is pressed against ski 2 by a a spring 7. The distance between cutter 1 and ski 2 is determined by a distance roller 9 which is rotatably arranged about an axis 8 on the cutter holder 4, in the manner of a wheel. This distance roller 9 rolls along the sliding surface of the ski. Consequently, the depth of the channel 10 is determined. The material of the channel 10 is removed in a single cutting 11.

The distance roller 9 guarantees uniform depth of the channel. At the beginning 12 of the ski and at the ending 13, the guide channel 10 is designed to be more shallow and to merge into the sliding surface. This is achieved by wedge-shaped supports on the sliding surface of the ski, indicated by reference numerals 14 and 15.

Figure 3:
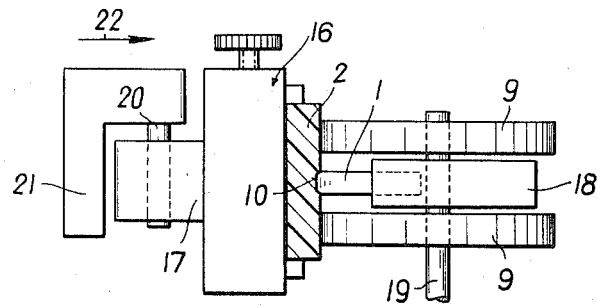
FIG.3 illustrates a variation in which the ski is resiliently supported.

In the arrangement according to FIG.3, the ski 2 is held by a fixing device 16 and is moved by feed rollers 17, which may have a rubber tread in order to increase friction, in longitudinal direction past the stationary cutter 1, the cutter removing a cutting corresponding to the cross-section of channel 10. Here, the cutter holder 18 is stationarily and rigidly supported on a supporting pin 19 which simultaneously forms the axis for the distance roller 9. The axes 20 of the feed rollers 17 are resiliently supported on their support 21 and are resiliently pressed in the direction of arrow 22. The fixing device 16 with the ski 2 is thereby movably supported in transverse direction, i.e., in direction of arrow 22, and is pressed against the distance roll 9 in the direction of arrow 22 by the resiliently supported feed rollers 17. In this case, the arrangement is such that the ski 2 with the fixing device 16 are resiliently pressed against the cutter 1, the depth of the cut being determined by distance roller 9 rolling along the sliding surface 6 of the ski.

Figure 4:
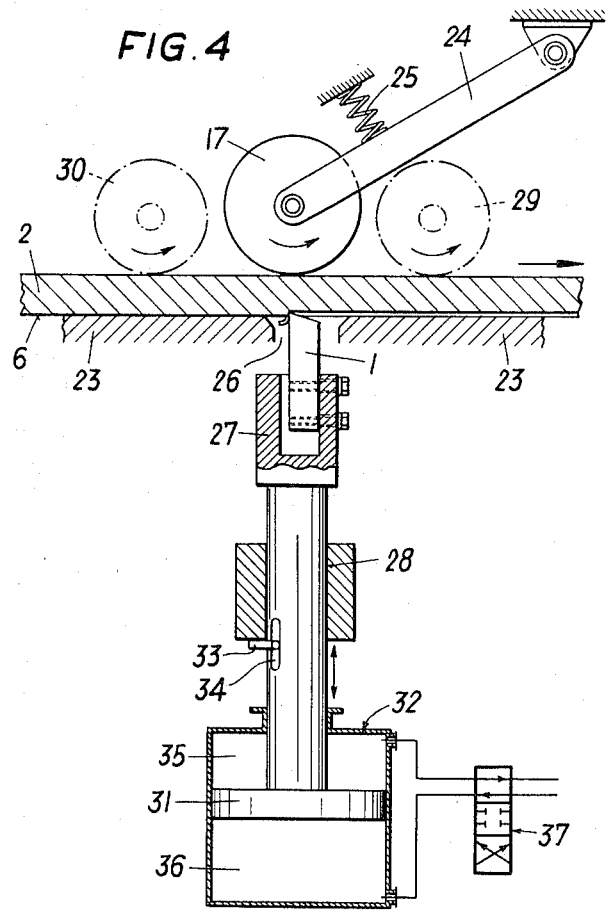
FIG. 4 shows an embodiment in which the cutter is movable relative to the controlling device.

In the arrangement according to FIG.4 the controlling device cooperating with the sliding surface 6 of the ski 2 is formed by a support or a table 23 against which the ski is pressed by a feed roller 17. This feed roller 17 is mounted to a lever 24 biased by a spring 25. Additional feed rollers 29 and 30 can also be provided. In this case, the feed rollers 17, 29 and 30 cooperate directly with the surface of the ski.2.

The cutter 1 projects through an aperture 26 of the support 23 and is fixed to the cutter holder 27 which can be moved in a guide 28 vertically with respect to the cutting direction or vertically with respect to the sliding surface 6 of the ski. In the lower part of the cutter holder 27 a piston 31 is provided which is moved within the cylinder 32. The highest position of the cutter 1, and thus the greatest cutting depth, is determined by a stop 33 which is adjustable in a slotted hole 34 within the cutter holder 27. The cylinder 32 is a pneumatic or a hydraulic cylinder, the working chambers 35 and 36 being filled wither with a gaseous or a liquid pressure medium. Thus, the cutter 1 may be withdrawn in order to make the channel depth variable by a controlling means indicated as 37.

Figure 5:
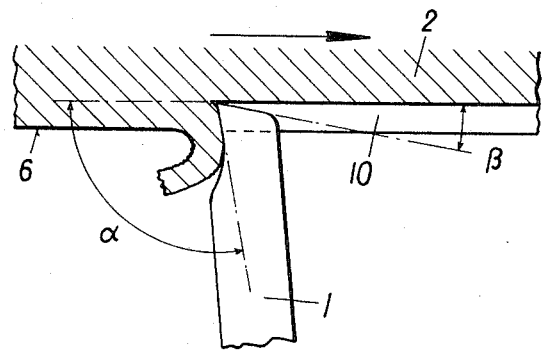
FIG.5 shows the blade angle and the cutting angle of the blade on a larger scale.

It has been determined that a special advantage is achieved if the blade angle, alpha, of the cutter is 90° to 95° and the cutting angle, beta, is 4° to 10°. The blade angle, alpha, and the cutting angle of the blade, beta, are shown symbolically in enlarged scale in FIG.5.

What we claim is:

1. Apparatus for forming a guide channel in a plastic sliding surface of a ski, comprising:
    a cutter shaped to correspond to the cross-section of the channel to be formed;
    means for moving said ski in its longitudinal direction to bring the plastic sliding surface into contact with said cutter;
    means for maintaining the cutter immovable with respect to the longitudinal direction of movement of said ski; and
    means for obtaining relative movement of said cutter and the ski in a direction normal to the longitudinal direction of the ski during contact of the cutter with the plastic sliding surface so as to control the depth of the channel formed in said surface.

2. Apparatus as set forth in claim 1, wherein the blade angle of the cutter is in the range of 90° to 95° and the cutting angle of the blade is in the range of 4° to 10°.

3. Apparatus as set forth in claim 1, wherein the means for obtaining said relative movement of the cutter and the ski comprises at least one roller mounted on support means to which said cutter is attached, said roller engaging: the sliding surface of said ski and wedge-shape devices attached to the sliding surface, to thereby vary the depth of the channel.

4. Apparatus as set forth in claim 3, wherein the blade angle of the cutter is in the range of 90° to 95° and the cutting angle of the blade is in the range of 4° to 10°.

5. Apparatus as set forth in claim 1, wherein the means for moving said ski in its longitudinal direction comprises at least one resiliently supported feed roller which presses the ski towards said cutter, said apparatus further comprising at least one additional roller mounted on support means to which said cutter is attached, said additional roller controlling the maximum depth of said channel when the resiliently supported feed roller presses the sliding surface of the ski into engagement with said additional roller.

6. Apparatus as set forth in claim 5, wherein the blade angle of the cutter is in the range of 90° to 95° and the cutting angle of the blade is in the range of 4° to 10°.

7. Apparatus as set forth in claim 1, wherein the means for obtaining said relative movement of the cutter and the ski comprises a fluid control device joined to said cutter and selectively operable to adjust the position of the cutter with respect to the sliding surface to thereby vary the depth of the channel.

8. Apparatus as set forth in claim 7, wherein the blade angle of the cutter is in the range of 90° to 95° and the cutting angle of the blade is in the range of 4° to 10°.

9. Apparatus as set forth in claim 1, wherein the means for moving said ski in its longitudinal direction comprises at least one resiliently supported feed roller which presses said ski against means for slidably supporting the ski, the latter means having an aperture therein through which said cutter projects to contact the plastic sliding surface.

10. Apparatus as set forth in claim 9, wherein the means for obtaining said relative movement of the cutter and the ski comprises a fluid control device joined to said cutter and selectively operable to adjust the position of the cutter with respect to the sliding surface to thereby vary the depth of the channel.

11. Apparatus as set forth in claim 10, wherein the blade angle of the cutter is in the range of 90° to 95° and the cutting angle of the blade is in the range of 4° to 10°.

* * * * *

UNITED STATES PATENT OFFICE
CERTIFICATE OF CORRECTION

Patent No. 3,752,028     Dated August 14, 1973

Inventor(s) George H. Waizmann - Robert G. Cook, Sr.

It is certified that error appears in the above-identified patent and that said Letters Patent are hereby corrected as shown below:

Col. 4, line 3, "extendd" is amended to read -- extended --;

line 20, "arm" is amended to read -- ram --;

line 31, "th" is amended to read -- the --.

Col. 5, line 6, "shouldler" is amended to read -- shoulder --;

line 25, "ocmplementary" is amended to read -- complementary --;

line 26, "of" is amended to read -- on --;

Col. 7, line 18, "constructed" is amended to read -- construed -

Col. 8, line 40, "fo" is amended to read -- of --.

Col. 9, line 61, "180" is amended to read -- 130 --.

Claim 9, line 4, "surface" is amended to read -- surfaces --.

Claim 21, line 9 thereof, "lacking" is amended to read -- locking --.

Claim 10, line 3 "said" should read -- same --.

Signed and sealed this 30th day of April 1974.

(SEAL)
Attest:

EDWARD M.FLETCHER,JR.
Attesting Officer

C. MARSHALL DANN
Commissioner of Patents